(12) United States Patent
Besutti et al.

(10) Patent No.: US 12,342,910 B2
(45) Date of Patent: Jul. 1, 2025

(54) JEWEL, IN PARTICULAR FOR A HOROLOGICAL MOVEMENT, AND THE MANUFACTURING METHOD THEREOF

(71) Applicant: Comadur SA, Le Locle (CH)

(72) Inventors: Bruno Besutti, Charquemont (FR); Sébastien Retrouvey, Chissey sur Loue (FR); Sébastien Midol, Sancey (FR)

(73) Assignee: Comadur S.A., Le Locle (CH)

( * ) Notice: Subject to any disclaimer, the term of this patent is extended or adjusted under 35 U.S.C. 154(b) by 1233 days.

(21) Appl. No.: 17/099,119

(22) Filed: Nov. 16, 2020

(65) Prior Publication Data

US 2021/0169184 A1 Jun. 10, 2021

(30) Foreign Application Priority Data

Dec. 10, 2019 (EP) .................................. 19214879

(51) Int. Cl.
| | | |
|---|---|---|
| *B28B 11/04* | (2006.01) | |
| *A44C 17/00* | (2006.01) | |
| *B28B 3/08* | (2006.01) | |
| *B28B 11/08* | (2006.01) | |
| *B28B 11/12* | (2006.01) | |
| *B28B 11/24* | (2006.01) | |
| *G04B 31/06* | (2006.01) | |
| *G04D 3/00* | (2006.01) | |

(52) U.S. Cl.
CPC ............ *A44C 17/005* (2013.01); *B28B 3/086* (2013.01); *B28B 11/04* (2013.01); *B28B 11/0845* (2013.01); *B28B 11/12* (2013.01); *B28B 11/243* (2013.01); *G04B 31/06* (2013.01); *G04D 3/0058* (2013.01)

(58) Field of Classification Search
CPC ..... B28B 3/086; B28B 11/04; B28B 11/0845; B28B 11/12; B28B 11/243; G04B 31/06; G04D 3/0058
USPC ......................................................... 264/632
See application file for complete search history.

(56) References Cited

U.S. PATENT DOCUMENTS

2019/0146416 A1  5/2019  Besutti et al.

FOREIGN PATENT DOCUMENTS

| CH | 371 387 A | 4/1963 |
|---|---|---|
| CH | 495 801 A | 4/1970 |
| CH | 561 924 B5 | 5/1975 |
| CN | 205915486 U | 2/2017 |

(Continued)

OTHER PUBLICATIONS

European Search Report 19 21 4879 dated Apr. 29, 2020.

*Primary Examiner* — Christina A Johnson
*Assistant Examiner* — Xue H Liu
(74) *Attorney, Agent, or Firm* — Sughrue Mion, PLLC

(57) ABSTRACT

A method for manufacturing a jewel of the polycrystalline type, in particular for a timepiece, the jewel including, for example, poly-ruby of the type al2O3Cr or Zirconia of the type ZrO2, the method including a first step of producing a precursor, and a second step of pressing the precursor in order to form a body, the pressing being carried out using a pressing device provided with an upper die and a lower die defining a pressing space in which the precursor is disposed, the device being provided with a wire passing through at least part of the lower die to open out into the pressing space, the lower die being capable of sliding about the wire, the pressing taking place by bringing the lower die and the upper die closer to one another to form a body comprising a bottom face provided with a hole.

8 Claims, 3 Drawing Sheets

(56) References Cited

FOREIGN PATENT DOCUMENTS

| | | |
|---|---|---|
| CN | 109773944 A | 5/2019 |
| EP | 2778801 A1 | 9/2014 |
| EP | 3 483 665 A1 | 5/2019 |
| JP | 58-20410 A | 2/1983 |
| JP | 2019-90801 A | 6/2019 |

JEWEL, IN PARTICULAR FOR A HOROLOGICAL MOVEMENT, AND THE MANUFACTURING METHOD THEREOF

CROSS-REFERENCE TO RELATED APPLICATIONS

This application claims priority to European Patent Application No. 19214879.9 filed Dec. 10, 2019, the entire contents of which are incorporated herein by reference.

FIELD OF THE INVENTION

The invention relates to a method for manufacturing a jewel, in particular for a horological movement.

The invention further relates to a jewel, in particular of a horological movement, for example an industrial jewel or a technical ceramic.

The invention further relates to a horological movement including such a jewel.

The invention further relates to a pressing device for implementing the method.

BACKGROUND OF THE INVENTION

In the prior art in the horological field, jewels of the ruby, ZrO2 or sapphire type are in particular used to form endstones or guide elements known as bearings in timepieces. These endstones and guide elements are intended to come into contact with pivots to make same capable of moving in rotation with minimal friction. They thus form, for example, all or part of a bearing of a staff mounted such that it rotates. The guide elements generally comprise a through-hole so that the staff of the pivot can be inserted therein.

FIG. 1 shows a bearing 1 for a pivot 2 of a rotating wheel set according to the prior art. The bearing 1 comprises a bearing block 3, wherein a guide element 4 is arranged, which in this case is a jewel. The jewel includes a through-hole 5 for receiving the end 6 of the pivot 2. Thus, the pivot 2 can rotate inside the hole 5.

In principle, synthetic industrial jewels are used in horological movements. In particular, the Verneuil method is known for manufacturing monocrystalline-type jewels. Polycrystalline jewels also exist, which are manufactured by pressing a precursor in order to obtain a green body of the future jewel from a pressing tool. The jewels are then sintered, and machined to obtain a finished shape having the desired dimensions. In particular, as regards guide elements made of a polycrystalline jewel, the pressing tool is, for example, provided with a wire contributing to producing a hole blank.

However, these techniques for machining these polycrystalline jewels do not allow holes with small dimensions to be obtained. In particular, diameters as small as 0.11 mm can be achieved using conventional techniques known to date. However, this value cannot be reduced further. In order to further reduce this value, laser technologies must be used, which are difficult to implement on an industrial scale, and which do not directly give the hole a high-quality surface finish.

SUMMARY OF THE INVENTION

The purpose of the present invention is to overcome all or part of the aforementioned drawbacks by proposing a method for manufacturing a jewel on a large scale, allowing a hole having a very small diameter to be produced.

For this purpose, the invention relates to a method for manufacturing a jewel of the polycrystalline type, in particular for a timepiece, the jewel comprising, for example, poly-ruby of the type al2O3Cr or Zirconia ceramic of the type ZrO2, the method comprising a first step of producing a precursor.

The method is noteworthy in that it comprises a second step of pressing the precursor in order to form a body, the pressing being carried out using a pressing device provided with an upper die and a lower die defining a pressing space in which the precursor is disposed, the device being provided with a wire passing through at least part of the lower die to open out into the pressing space, the lower die being capable of sliding about the wire, the pressing taking place by bringing the lower die and the upper die closer to one another to form a body comprising a bottom face provided with a hole.

Thus, this method allows green bodies to be formed which, after sintering and machining, give jewels having a hole with a very small diameter, in particular less than or equal to 0.1 mm. This method is furthermore implemented by a pressing device that is easy to use, the pressing device used being an enhancement of a device used to manufacture a green body. The invention thus allows these jewels to be manufactured industrially on a large scale, without the use of systems that are expensive and complicated to implement.

According to one specific embodiment of the invention, the pressing step is carried out by displacing the lower die towards the upper die about the stationary wire.

According to one specific embodiment of the invention, during pressing, a substantially planar top face of the body is formed, the upper die being provided with a substantially planar surface.

According to one specific embodiment of the invention, the upper die is stationary during pressing.

According to one specific embodiment of the invention, a flaring is made about the hole on the bottom face thereof during the pressing step, the lower die being further provided with a domed part.

According to one specific embodiment of the invention, the flaring has a conical, rounded or plateau shape, the domed part of the lower die having a corresponding domed part about the wire.

According to one specific embodiment of the invention, the upper die remains stationary during the pressing step.

According to one specific embodiment of the invention, the method comprises a third step of sintering said body in order to form the mineral body.

According to one specific embodiment of the invention, the method comprises a fourth machining step for cutting the jewel to predefined dimensions, in particular to form a through-hole.

According to one specific embodiment of the invention, the method comprises a fifth finishing step, for example for lapping and/or brushing and/or polishing the mineral body.

The invention further relates to a jewel, in particular for a horological movement, formed from a body of the polycrystalline type and comprising, for example poly-ruby of the type al2O3Cr or Zirconia of the type ZrO2, the body being capable of being obtained by the method according to the invention. The jewel is noteworthy in that the body comprises a bottom face provided with a hole, the diameter whereof is less than 0.11 mm.

According to one specific embodiment of the invention, the diameter of the hole lies in the range 0.2 to 0.8 mm, or even in the range 0.4 to 0.6 mm.

According to one specific embodiment of the invention, the jewel comprises a flaring about the hole on the bottom face thereof.

According to one specific embodiment of the invention, the flaring has a conical, rounded or plateau shape.

The invention further relates to a timepiece comprising such a jewel, in particular fora balance bearing.

The invention further relates to a pressing device for manufacturing a jewel, in particular for a timepiece, the device comprising a casing defining a housing, an upper die and a lower die configured to be able to move inside the housing, the dies defining a pressing space in which a precursor can be disposed, the device being provided with a wire passing through at least part of the lower die to open out into the pressing space, the wire being stationary relative to the lower die and centred on the die button of the upper die, the lower die comprising an orifice for receiving the wire, the lower die being capable of sliding about the wire.

According to one specific embodiment of the invention, the lower die comprises a domed part to form a flaring about the hole on the bottom face of the body.

According to one specific embodiment of the invention, the flaring has a conical, rounded or plateau shape.

BRIEF DESCRIPTION OF THE DRAWINGS

Other specific features and advantages will be clearly observed in the following description, which is given as a rough guide and in no way as a limited guide, with reference to the accompanying figures, wherein.

DETAILED DESCRIPTION OF THE PREFERRED EMBODIMENTS

Figure 1:
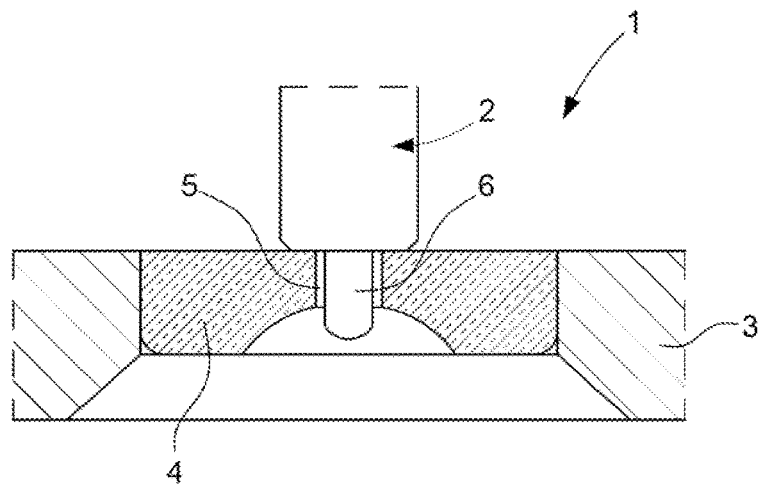
FIG. 1 is a diagrammatic view of a bearing for a pivot according to one known embodiment of the prior art.

As explained hereinabove, the invention relates to a method 10 for manufacturing a jewel capable of forming a guide element of a timepiece. The jewel is, for example, intended to come into contact with a pivot, also referred to as a trunnion, for example of a balance staff, in order to make same able to rotate with minimal friction. It is thus understood that the present invention in particular allows a jewel to be produced, which jewel is capable of forming all or part of a bearing of a staff mounted such that it can rotate, such as that shown in FIG. 1.

The jewel is formed from a precursor, modelled in the form of a green body, which becomes a mineral body of the polycrystalline type for sapphire, the body comprising, for example, poly-ruby of the type al2O3Cr or Zirconia ceramic of the type ZrO2. The mineral body is cut to become the final jewel.

Figure 2:
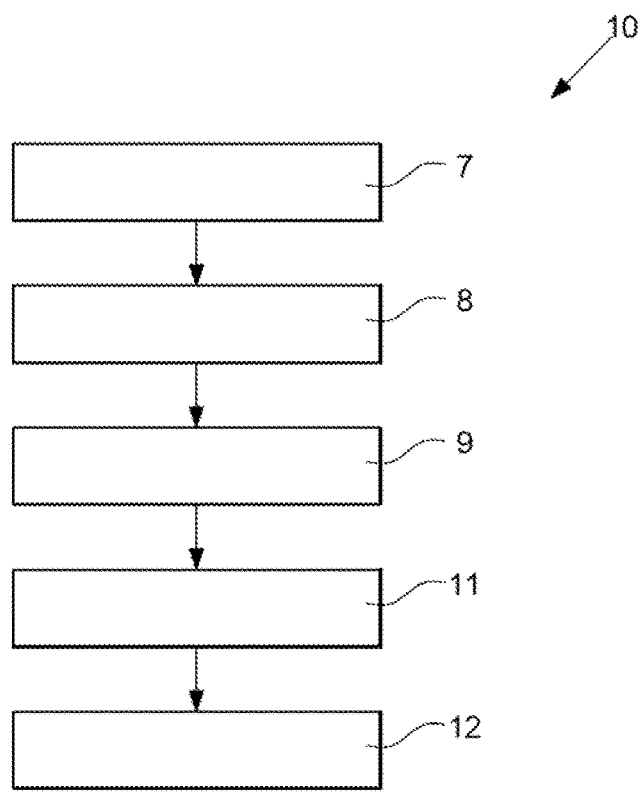
FIG. 2 is a block diagram of a method for producing a jewel according to the invention.

In the embodiment 5 of the method, shown in FIG. 2, such a method includes a first step 7 of producing a precursor from a mixture of at least one powder material with a binder. This material can be, in a non-limiting and non-exhaustive manner, ceramic. This step 7 is intended to form a precursor from a ceramic-based powder contained in the binder.

In this context, the ceramic-based powder can contain at least one metal oxide, one metal nitride or one metal carbide. For the purposes of illustration, the ceramic-based powder can contain aluminium oxide in order to form synthetic sapphire or a mixture of aluminium oxide and chromium oxide to form synthetic ruby, or even zirconium oxide. Moreover, the binder can have various natures such as, for example, of the polymer or organic type.

The embodiment then includes a second step 8 of pressing the precursor using an upper die and a lower die of a pressing device in order to form a green body of the future jewel. The pressing step is shown in FIGS. 4 to 7, which are described in the description hereafter. The pressing step 8 allows a green body with a hole to be obtained. It is thus understood that the shape of the hole is procured by the shape of the wire 17 of the lower die 16 of the pressing device 20.

The method comprises a third step 9 of sintering said green body in order to form the mineral body of the future jewel in said at least one material. The material can be, as stated hereinabove, ceramic. In other words, this step 9 is intended to sinter the green body to form a ceramic body of the future perforated jewel. Preferentially, according to the invention, the sintering step 9 can include pyrolysis, for example by thermal debinding.

The method 10 comprises a fourth machining step 11, in particular to cut the mineral body to predefined dimensions, in particular to obtain a hole that passes all the way through the jewel. The machining operation consists, for example, of planning the top face of the body. Thus, by removing a top part of the body, the hole in the top face of the body is opened in order to obtain a through-hole from the bottom face. The machining step 11 further comprises a sub-step of shaping the bottom face to obtain a predefined jewel thickness.

The method comprises a fifth finishing step 12, for example for lapping and/or brushing and/or polishing the mineral body. This finishing step gives the jewel a surface finish that is compatible with the use thereof. Such a finishing step further allows the final dimensions to be adjusted and/or edges to be removed and/or the surface roughness to be modified locally.

In FIGS. 3 to 6, the pressing device 20 comprises a casing 15 provided with a chamber closed off by an upper die 22, and in which a lower die 16 can slide. Each die 16, 22 is fastened to a double-action press. The upper die 22 and the lower die 16 define a pressing space 25 in which the precursor 21 is disposed.

Figure 3:
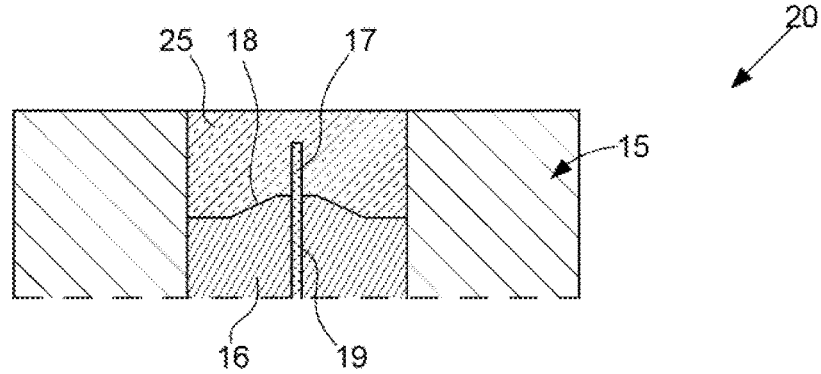
FIG. 3 is a diagrammatic view of a part of a pressing device according to the invention.
Figure 4:
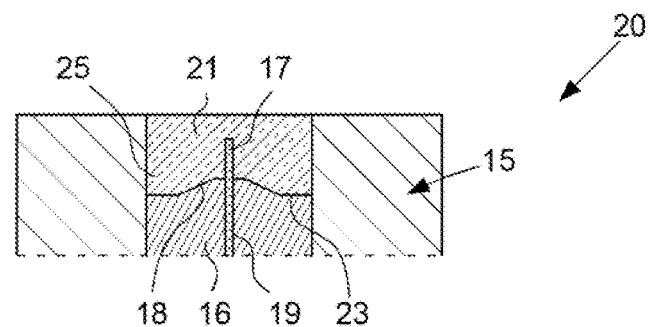
FIG. 4 is a diagrammatic view of the part in FIG. 4 with the precursor.
Figure 5:
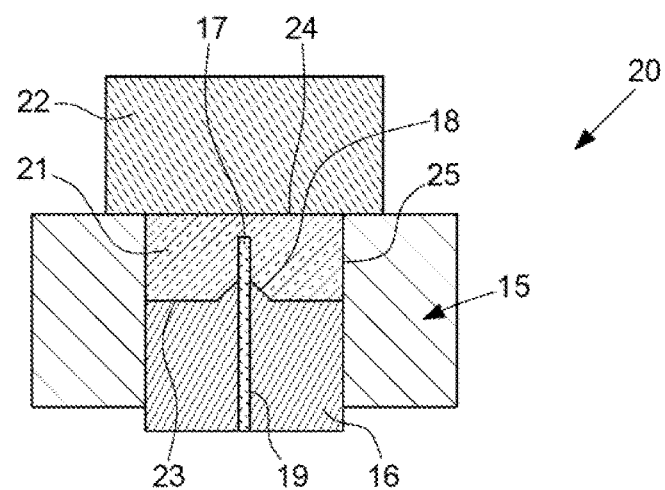
FIG. 5 is a diagrammatic view of the pressing device according to the invention.
Figure 6:
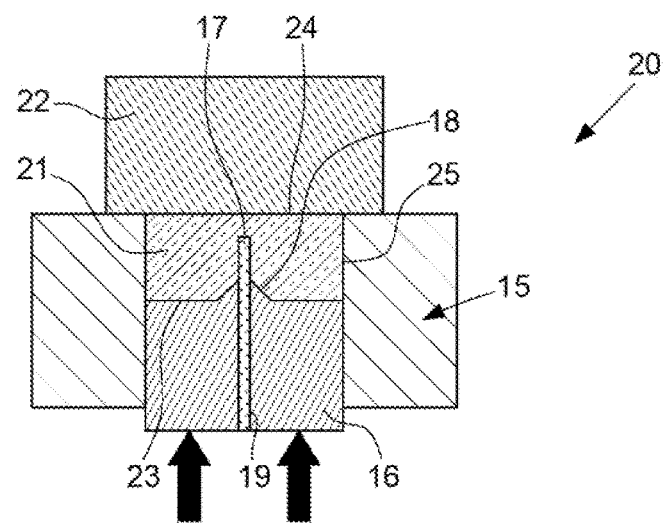
FIG. 6 is a diagrammatic view of the pressing device according to the invention during pressing.

In FIGS. 3 and 4, only the lower die 16 is shown. The device 10 is further provided with a wire 17 passing through at least part of the lower die 16 to open out into the pressing space 25. The wire 17 is stationary relative to the lower die 16 and centred about the lower die 16. The lower die 16 comprises an orifice 19 for passing the wire 17. Thus, the lower die 16 slides about the wire 17. The wire 17 is thus unmoving relative to the lower die 16.

The lower die 16 is furthermore provided with a domed part 18. According to a first embodiment, shown in FIG. 4, the domed part 18 has a conical shape with a wide apex angle that lies for example in the range 60° to 140°, preferably in the range 90° to 120°. The domed part 18 is centred on the lower die 16, such that the passage 19 and thus the wire 17 are arranged at the apex of the domed part 18.

A second embodiment of the lower die includes a domed part having a rounded shape. In a third embodiment, the domed part has the shape of a plateau with a rounded edge. The second and third embodiments of the lower die are not shown in the figures, however the shape of the domed part matches the shape of the flaring 34, 38, 48 of the bodies 30, 33, 43 corresponding to FIGS. 7 to 9.

The precursor 21 is positioned in the pressing space 25 as shown in FIG. 4. The upper die 22 is then positioned above the housing to close same.

The upper die 22 comprises a substantially planar surface. Thus, during pressing, the top face of the green body is substantially planar.

The pressing 8 is carried out by bringing the upper die 22 and the lower die 16 closer to one another in order to compress the precursor 21 in the pressing space 25. Preferably, the pressing 8 is carried out by displacing the lower die 16 towards the upper die 22 about the stationary wire 17. Thus, the precursor 21 is packed against the upper die 22 to give the green body a shape that matches the pressing space 25 once the two dies 16, 22 have been brought towards one another. The green body thus takes the shape of the upper die 22 and lower die 16 for the top face 36 and bottom face 37 of the body.

Thus, such a pressing step 8 is intended to compress the precursor 21 to form the green body of the future perforated jewel with a hole in the bottom face 37 thereof. Preferably, the upper die 22 remains stationary and does not move under the effect of the pressure from the lower die 16 during pressing 8.

Figure 7:
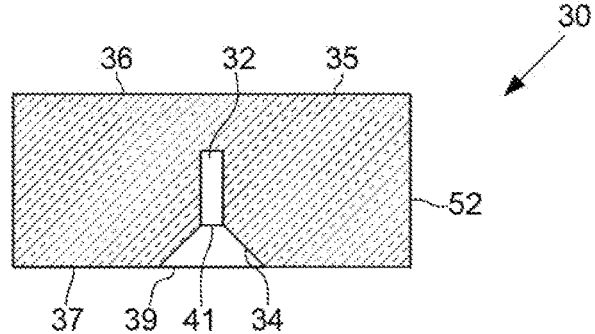
FIG. 7 is a diagrammatic view of a first embodiment of a green body obtained after the pressing step of the method according to the invention.

FIG. 7 shows the green body 30 thus obtained. The green body 30 comprises a planar top face 36. The green body 30 comprises a bottom face 37 provided with a hole 32. The hole 32 was formed by the wire during pressing. The hole 32 is cylindrical in shape. The hole 32 has a chosen depth. At this stage, the hole 32 is not a through-hole, but instead has a bottom. Thanks to the method, a hole 32 of very small diameter is obtained, which diameter can in particular be less than 0.1 mm, or even less than 0.05 mm.

In this embodiment, the bottom face 37 of the body 30 is provided with a flared part 34, the flared part 34 bordering the hole 32. The flared part 34 is conical in shape. This flaring thus forms an engagement cone for the perforated jewel 40. The cone 12 is preferably circular. The cone has a first opening 39 at the base thereof and a second opening 41 at the apex thereof. The first opening 39 is larger than the second 41, and is formed in the bottom face 37 of the body 30. The link between the cone 34 and the hole 32 is produced by way of the second opening 41 to form an edge. Thus, the flaring 34 allows for easy insertion of the pivot of a staff of a piece capable of rotating, in particular in the event of an impact. The angle of the cone is selected such that it prevents the edge formed by the top of the cone and the hole 8 from projecting to a too great extent. For example, an angle that lies in the range 60° to 140°, preferably in the range 90° to 120° is chosen.

Figure 8:
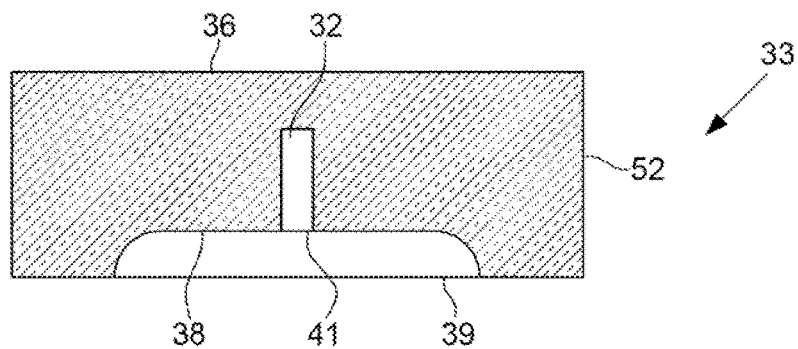
FIG. 8 is a diagrammatic view of a second embodiment of a green body obtained after the pressing step of the method according to the invention.

In FIG. 8, a second embodiment of the green body comprises a flared part that is rounded in shape, and which has a radius of curvature. The rounded shape borders the hole of the body, and is centred about same. The hole is arranged in the bottom of the flaring.

Figure 9:
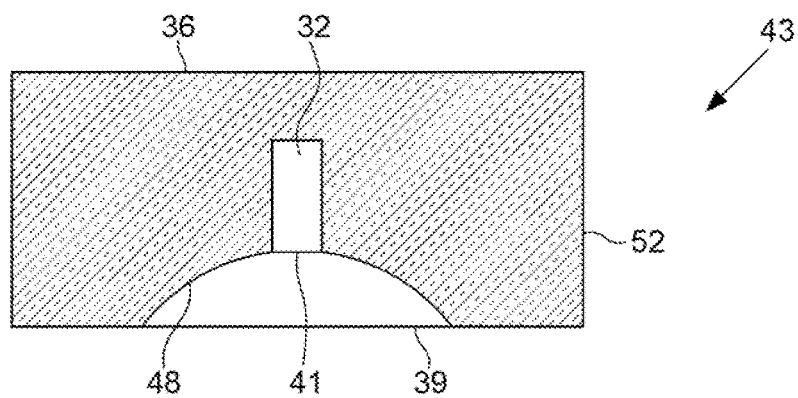
FIG. 9 is a diagrammatic view of a third embodiment of a green body obtained after the pressing step of the method according to the invention.

A third embodiment of the green body, shown in FIG. 9, comprises a flaring in the shape of a plateau with a rounded border.

The green body 30, once formed, is subjected to the sintering step to obtain a mineral body, which retains an identical shape.

Figure 10:
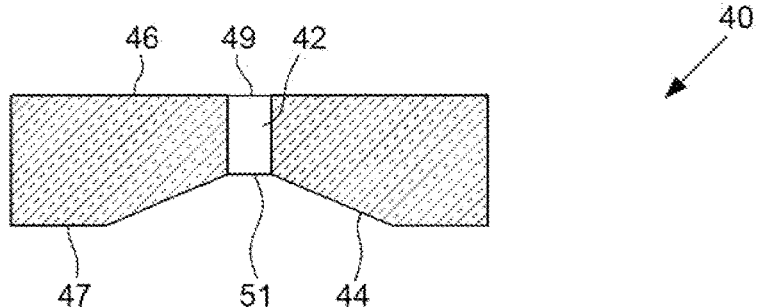
FIG. 10 is a diagrammatic view of a jewel obtained using the method according to the invention.

FIG. 10 shows an example of a jewel 40 obtained after all of the steps of the method 10. Such a jewel 40 can be used as a guide element mounted inside a bearing, such as that shown in FIG. 1. However, such a jewel is not limited to the horological field and can be applied to any element mounted such that it can move relative to a bearing, or to an industrial jewel (water jet nozzle, etc.), or to a ceramic technique (insulator, etc.). The jewel 40 comprises the features described in the above method. A hole 42 intended to receive a pivot passes through the jewel 40. The jewel 40 has a top face 46 and a bottom face 47, one whereof comprises a functional element, in this case a cone 44, communicating with the through-hole 42. The top face 36 is substantially planar and comprises the other side of the through-hole 42. In other words, the hole 42 communicates with the top face 46 and with the bottom face 47. Such a through-hole 32 comprises a first opening 49 defined in the mineral body and opening out into the bottom face 37. The through-hole 32 further comprises a second opening 51 defined in the mineral body 30 and opening out into the top face 36. Such a jewel has, for example, a thickness of 0.18 mm and a diameter of 0.8 mm, and a hole having a diameter of less than 0.1 mm. Such dimensions allow pivots of very small dimensions to be used. Preferably, the entire top face 36 has the same height. Thus, the top face 36 of the body is planar, outside of the hole 32. Material can also be removed from the top face 36 during the machining step, to obtain a desired jewel thickness.

The machining step 11 can further comprise a sub-step of planning the peripheral face 52 of the mineral body 30, in order to procure a determined diameter. The machining step 11 can also comprise a sub-step of planning the bottom face 37, or even of widening or cutting the hole 32.

It goes without saying that the present invention is not limited to the example shown but that various alternatives and modifications that may be apparent to a person skilled in the art can be made thereto. In particular, other types of functional elements formed during the pressing step can be advantageously considered according to the invention.

Figure 11:
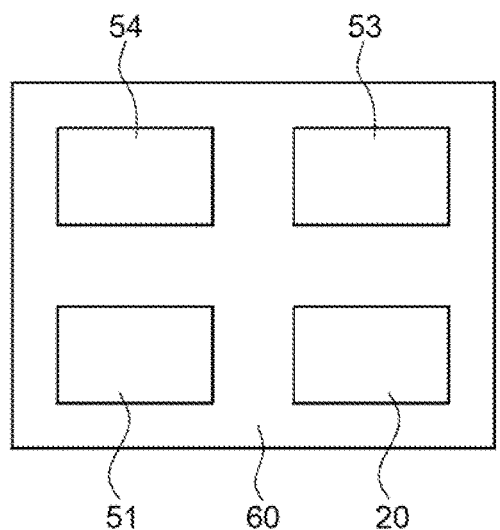
FIG. 11 is a diagrammatic view of a system for manufacturing a jewel comprising a pressing device according to the invention.

With reference to FIG. 11, the invention further relates to a system 60 for manufacturing the jewel. This system 60 comprises the following different devices:
- a device 51 for producing a precursor from a mixture of at least one powder material with a binder;
- a device 20 for pressing the precursor material as defined hereinabove;
- a device 53 for sintering said green body; and
- a device 54 for machining the body 30 of the future jewel after sintering the green body.

It should be noted that at least two of these devices 20, 51, 53 and 54 can jointly form the same entity of the system 60. Such a system 60 is capable of implementing the method for manufacturing the jewel 40 shown in FIG. 10, by implementing the steps in FIG. 2.

The invention claimed is:

1. A method (10) for manufacturing a jewel (40) of a polycrystalline type for a timepiece, the jewel (40) comprising poly-ruby of a type Al2O3Cr or Zirconia of a type ZrO2, the method comprising:
   a first step (7) of producing a precursor (21),
   a second step (8) of pressing the precursor (21) in order to form a body (30),
      the pressing (8) being carried out using a pressing device (20) provided with an upper die (22) and a lower die (16) defining a pressing space (25) in which the precursor (21) is disposed,
      the device (20) being provided with a wire (17) passing through at least part of the lower die (16) to open out into the pressing space (25),
      the lower die (16) being configured to slide about the wire (17) during the pressing step (8),
      the pressing (8) taking place by bringing the lower die (16) and the upper die (22) closer to one another to form a body (30) comprising a bottom face (37) provided with a hole (32),
   wherein the upper die (22) is stationary during the pressing step (8).

2. The method according to claim 1, wherein the pressing (8) is carried out by displacing the lower die (16) towards the upper die (22).

3. The method according to claim 1, wherein during pressing (8), a substantially planar top face of the body is formed, the upper die (22) being provided with a substantially planar surface.

4. The method according to claim 1, wherein a flaring (34) is formed about the hole (32) on the bottom face (37) thereof during the pressing step (8), the lower die (16) being furthermore provided with a domed part (18).

5. The method according to claim 4, wherein the flaring (34) has a conical, rounded or plateau shape, the domed part (18) of the lower die (16) having a corresponding domed part about the wire (17).

6. The method according to claim 1, wherein the method (10) comprises a third step (9) of sintering said body (30) in order to form a mineral body.

7. The method according to claim 6, wherein the method (10) comprises a fourth machining step (11) to cut the jewel to predefined dimensions to form a through-hole (32).

8. The method according to claim 7, wherein the method (10) comprises a fifth finishing step (12) for lapping and/or brushing and/or polishing the mineral body.

* * * * *